United States Patent
Korepanov et al.

(10) Patent No.: US 12,259,853 B1
(45) Date of Patent: Mar. 25, 2025

(54) VIRTUAL CLIENT FILE SYSTEMS AND METHODS WITHIN REMOTE SESSIONS

(71) Applicant: PARALLELS INTERNATIONAL GmbH, Schaffhausen (CH)

(72) Inventors: Evgeniy Korepanov, Moscow (RU); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 0 days.

(21) Appl. No.: 18/333,914

(22) Filed: Jun. 13, 2023

Related U.S. Application Data

(63) Continuation of application No. 15/931,546, filed on May 13, 2020, now Pat. No. 11,709,804.

(51) Int. Cl.
*G06F 16/188* (2019.01)
*G06F 16/13* (2019.01)
*G06F 16/16* (2019.01)
*H04L 67/025* (2022.01)
*H04L 67/08* (2022.01)

(52) U.S. Cl.
CPC ........... *G06F 16/188* (2019.01); *G06F 16/13* (2019.01); *G06F 16/164* (2019.01); *H04L 67/025* (2013.01); *H04L 67/08* (2013.01)

(58) Field of Classification Search
CPC ...... G06F 16/188; G06F 16/13; G06F 16/164; H04L 67/025; H04L 67/08
See application file for complete search history.

(56) References Cited

U.S. PATENT DOCUMENTS

| | | | |
|---|---|---|---|
| 7,610,348 B2 | 10/2009 | Kisley et al. | |
| 9,419,848 B1 | 8/2016 | Tidd | |
| 2009/0234823 A1 | 9/2009 | Wong | |
| 2011/0265183 A1* | 10/2011 | Wu | G06F 21/74 718/1 |
| 2012/0066607 A1* | 3/2012 | Song | G06F 9/5077 715/737 |
| 2012/0297311 A1* | 11/2012 | Duggal | H04L 67/025 715/740 |
| 2013/0110905 A1 | 5/2013 | Howe et al. | |
| 2015/0356078 A1 | 12/2015 | Kishimoto et al. | |

(Continued)

OTHER PUBLICATIONS

"Parallels Remote Application Server", Solutions Guide v15.5, https://www.parallels.com/fileadmin/docs/ras/resources/Parallels-RAS-v15-5-Solutions-Guide.pdf, 43 pages, 1999-2017.

(Continued)

*Primary Examiner* — Etienne P Leroux
*Assistant Examiner* — Oscar Wehovz
(74) *Attorney, Agent, or Firm* — Rosenberg, Klein & Lee

(57) ABSTRACT

A method is provided that includes establishing, by an application server, a remote access session with a client device, and creating, by a file system agent running on the application server, a metadata-only virtual file system associated with the remote access session, wherein the virtual file system only comprises file metadata associated with a plurality of files residing in a local file system of the client device. The method further includes responsive to receiving, by the virtual file system, a request to access content of a file referenced by the virtual file system, redirecting the request to a file system driver implementing at least a sub-tree of the local file system of the client device.

5 Claims, 7 Drawing Sheets

(56) References Cited

U.S. PATENT DOCUMENTS

2016/0231952 A1    8/2016   Broido et al.
2019/0014181 A1    1/2019   Ramasamy et al.
2019/0065525 A1*   2/2019   Malhotra ................ G06F 16/22
2019/0356416 A1*  11/2019   Yanovsky ............. G06F 3/0635

OTHER PUBLICATIONS

"Parallels Remote Appliction Server", Administrator's Guide v15.5 Update 2, https://download.parallels.com/ras/v15.5/docs/en_US/Parallels-RAS-v15-5-Administrators-Guide.pdf, 248 pages, 1999-2017.

"How Parallels Remote Application Server Enhances Microsoft RDS", White Paper, Parallels Remote Application Server, https://www.parallels.com/fileadmin/docs/ras/resources/WP_MaxRemoteDesktopServices_EN_A4.pdf, 11 pages, 2017.

* cited by examiner

VIRTUAL CLIENT FILE SYSTEMS AND METHODS WITHIN REMOTE SESSIONS

CROSS-REFERENCE TO RELATED APPLICATIONS

This patent application claims the benefit of priority as a continuation of U.S. Pat. No. 11,709,804 filed May 13, 2020; the entire contents of which are incorporated herein by reference.

TECHNICAL FIELD

This patent application relates to file management within remote software sessions and remote applications and more particularly to providing users with improved low latency access to remote file systems.

BACKGROUND

Software applications are an integral part of a wide range of electronic systems, electronic devices, etc. which allow a user or users to perform one or more activities with respect to the electronic systems, electronic devices, etc. Such applications can allow a user to generate, edit, and process electronic content which may represent text, numbers, audio, graphics, or a combination of these elements as well as other forms of electronic content. Some software applications focus on a single task, such as word processing, whilst others commonly referred to as integrated software can include several applications allowing the user to perform multiple tasks. This electronic content is stored within a file within a file system in electronic memory of either a device the user is accessing the software application upon, a portable memory such as a USB stick, or a memory forming part of a remote system or server. Increasingly, with cloud based services the physical location of the memory storing the file may be unknown to the user although its existence is evident within a depiction of the file system presented to the user.

However, when a user accesses a remote file system using a prior art methodology, such as Microsoft™ Remote Desktop Protocol (RDP) for example, then the user requires a directory listing of folders and/or files which are accessible to them in order to select a file and launch it within an application. However, RDP requires that information be transferred, in one instance, from a local file system associated with a client's device to a remote file system associated with a remote application the user has launched or is launching in order to allow the remote application to access the local file. In another instance, RDP requires that information be transferred from a remote file system to a local file system associated with a local application the user has launched or is launching in order to allow the local application to access the remote file.

However, such existing methodologies require that the communications channel between the local system and the remote system in either instance transfer a significant amount of information which results in a slow and downgraded user experience even with a large bandwidth channel and low latency storage media. Accordingly, either or both of a lower bandwidth network channel and high latency storage media will result in slower transfer and acquisition of the file system information further downgrading the user's experience.

BRIEF DESCRIPTION OF THE DRAWINGS

Embodiments of the present disclosure will now be described, by way of example only, with reference to the attached Figures, wherein.

DETAILED DESCRIPTION

Figure 1:
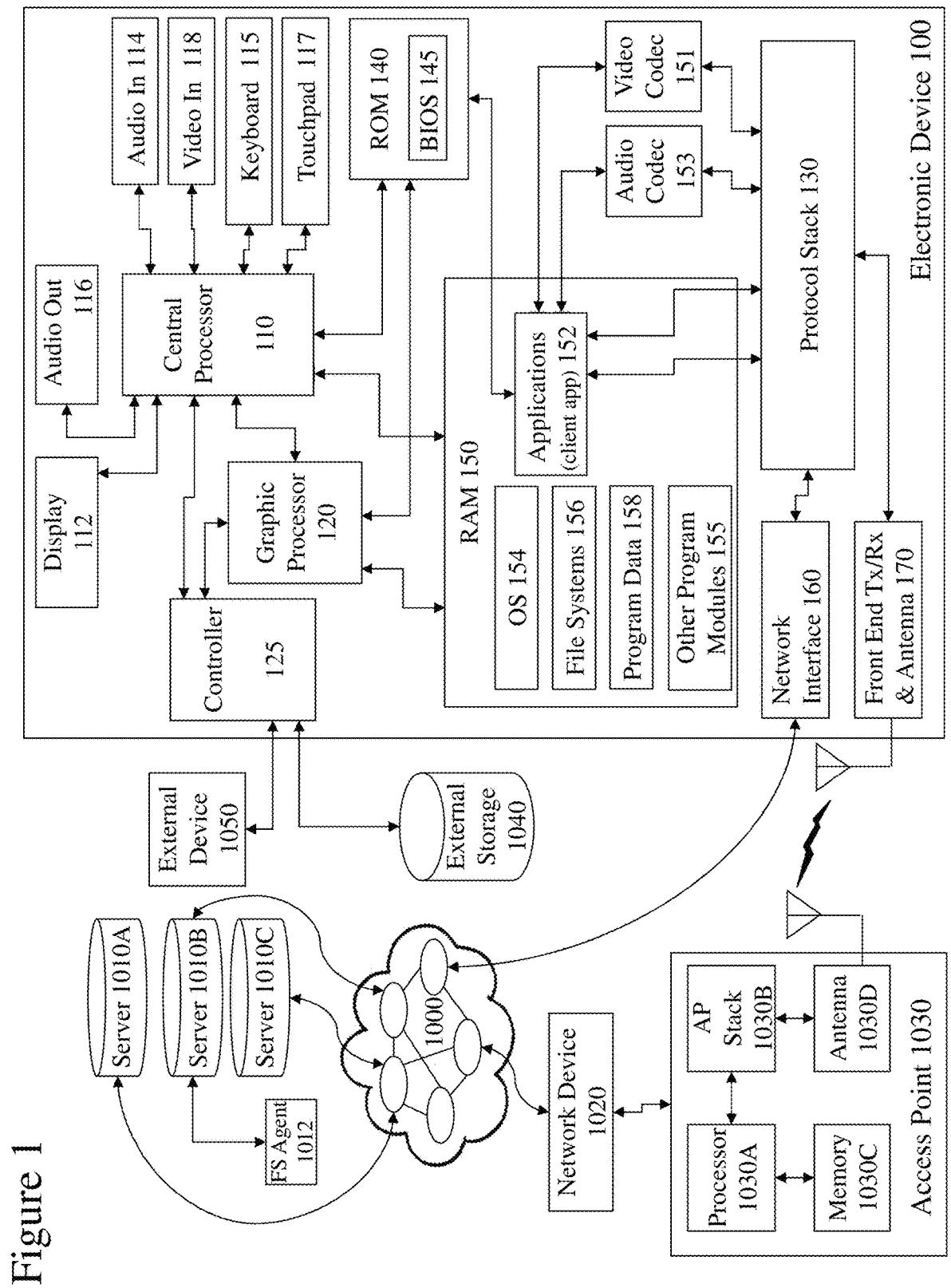
FIG. 1 depicts an exemplary computer system supporting some embodiments of the disclosure.

The present description is directed to file management within remote software sessions and remote applications and more particularly to providing users with improved low latency access to remote file systems.

The ensuing description provides representative embodiment(s) only, and is not intended to limit the scope, applicability or configuration of the disclosure. It is being understood that various changes can be made in the function and arrangement of elements without departing from the spirit and scope as set forth in the appended claims. Accordingly, an embodiment is an example or implementation of the disclosures and not the sole implementation. Various appearances of "one embodiment," "an embodiment" or "some embodiments" do not necessarily all refer to the same embodiments. Although various features of the disclosure may be described in the context of a single embodiment, the features may also be provided separately or in any suitable combination. Conversely, although the disclosure may be described herein in the context of separate embodiments for clarity, the disclosure can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the disclosures. The phraseology and terminology employed herein is not to be construed as limiting but is for descriptive purposes only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the disclosure. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the disclosure an application is generally presented in respect of software permanently and/or temporarily installed upon a PED and/or FED.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterized by an ability to exploit one or more embodiments of the disclosure. A user may also be associated through one or more accounts and/or profiles with one or more of a service provider, third party provider, enterprise, social network, social media etc. via a dashboard, web service, website, software plug-in, software application, and graphical user interface.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT for example. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "computer file" (commonly known as a file) as used herein, and throughout this disclosure, refers to a computer resource for recording data discretely in a computer storage device, this data being electronic content. A file may be defined by one of different types of computer files, designed for different purposes. A file may be designed to store electronic content such as a written message, a video, a computer program, or a wide variety of other kinds of data. Some types of files can store several types of information at once. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is defined by its content since a file is solely a container for data, although, on some platforms the format is usually indicated by its filename extension, specifying the rules for how the bytes must be organized and interpreted meaningfully. For example, the bytes of a plain text file are associated with either ASCII or UTF-8 characters, while the bytes of image, video, and audio files are interpreted otherwise. Some file types also allocate a few bytes for metadata, which allows a file to carry some basic information about itself.

A "client device" as used herein, and throughout this disclosure, refers to a PED, FED, or wearable device upon which a user can access directly a file or files which are stored locally upon the PED, FED, or wearable device, which are referred to as "local files", and/or a file or files which are stored remotely to the PED, FED, or wearable device, which are referred to as "remote files", and accessed through one or more network connections or interfaces to a storage device.

A "local file" as used herein, and throughout this disclosure, refers to a file, i.e. electronic content, which is stored directly upon a client device, e.g. a PED, FED, or wearable device, within a file system of the client's device.

A "remote file" as used herein, and throughout this disclosure, refers to a file, i.e. electronic content, which is stored externally to a client's device and is accessible either through the file system of the client device or through exploitation of one or more protocols for providing a client device with shared file access to the file stored upon a remote storage device. Storing externally to a client's device may include, but not be limited to, storing one or more files on a removable memory storage device which can be connected to the client device, for example a Universal Serial Bus memory (commonly referred to as a memory stick) or an external drive (e.g. external hard disk drive (HDD)) coupled to a wired or wireless interface of the client device. A remote storage device may include, but not be limited to, a remote HDD accessible to the client device via a network, a cloud storage account or cloud storage server accessible via a network (e.g. the Internet, Local Area Network (LAN), etc.) a remote server accessible via a network (e.g. via Ethernet, Wi-Fi, etc.).

"Shared files" or "files shared" from a client device as used herein, and throughout this disclosure, refers to one or more files accessible through a client device file system (FS) and made available to a remote server via a remote desktop session.

A "Virtual File System" (VFS) as used herein, and throughout this disclosure, refers to an abstract layer implemented on top of, or upon, a physical file system (concrete file system), i.e. a file system of one or more physical storage media. A VFS allows one or more client applications to access different types of concrete file systems in a uniform manner.

A "demilitarized zone" (commonly referred to as a DMZ, perimeter network or screened subnet) as used herein, and throughout this disclosure, refers to a physical or logical subnetwork that contains and exposes an organization's or enterprise's external-facing services to an untrusted network, usually a larger network such as the Internet. Accordingly, the DMZ adds an additional layer of security to an organization's local area network (LAN) wherein an external network node can access only what is exposed in the DMZ, while the rest of the organization's network is firewalled behind the DMZ. The DMZ functions as a small, isolated network positioned between the Internet and the private network of the organization and/or enterprise.

"Metadata" as used herein, and throughout this disclosure, refers to information stored as data that provides information about other data. Many distinct types of metadata exist, including but not limited to, descriptive metadata, structural metadata, administrative metadata, reference metadata and statistical metadata. Descriptive metadata may describe a resource for purposes such as discovery and identification and may include, but not be limited to, elements such as title, abstract, author, and keywords. Structural metadata relates to containers of data and indicates how compound objects are assembled and may include, but not be limited to, how pages are ordered to form chapters, and typically describes the types, versions, relationships and other characteristics of digital materials. Administrative metadata may provide information employed in managing a resource and may include, but not be limited to, when and how it was created, file type, technical information, and who can access it. Reference metadata may describe the contents and quality of statistical data whereas statistical metadata may also describe processes that collect, process, or produce statistical data. Statistical metadata may also be referred to as process data.

Referring to FIG. 1 there is depicted an Electronic Device 100 supporting virtual machine emulation systems, applications, and platforms (VME-SAPs) and/or VME-SAP features according to embodiments of the disclosure. Electronic Device 100 may, for example, be a PED, a FED, or a wearable device and may include additional elements above and beyond those described and depicted. Also depicted in conjunction with the Electronic Device 100 are exemplary internal and/or external elements forming part of a simplified functional diagram of an Electronic Device 100 within an overall simplified schematic of a system supporting SSAP features according to embodiments of the disclosure which include an Access Point (AP) 1030, such as a Wi-Fi AP for example, a Network Device 1020, such as a communication server, streaming media server, and a router. The Network Device 1020 may be coupled to the AP 1030 via any combination of networks, wired, wireless and/or optical communication links. Accordingly, the Electronic Device 100 can communicate via the AP 1030 and Network Device 1020 to Network 1000 and therein to remote services such as those depicted by First to Third Remote Servers 1010A to 1010C respectively. Each server 1010A-1010C may host a remote application (not shown) and an agent application (FS agent 1012). The remote application can establish a remote access session with a client device such as electronic device 100. The FS agent 1012 can then create a metadata-only virtual file system associated with the remote access session. The metadata-only virtual file system only includes file metadata for files residing in the local file system of the client device. The metadata-only virtual file system is provided to the client device where it is used to present the files to the user in a usual manner. When the user selects one of the files, a request to access content of the file is generated and sent to the virtual file system. The request is then redirected to a file system driver implementing at least a sub-tree of the local file system of the client device.

As depicted, the Network Device 1020 communicates to the AP 1030 according to one or more wireless communications standards through to the Antenna 1030D within the AP 1030 and to Front End Tx/Rx & Antenna 170. These wireless communications standard include, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It should be noted that many portable and fixed electronic devices may support multiple wireless protocols simultaneously, such that for example an Electronic Device 100 may employ GSM services such as telephony and SMS and Wi-Fi/WiMAX data transmission, VOIP and Internet access. Accordingly, Electronic Devices 100 may also form associations either through standards such as IEEE 802.15 or Bluetooth in an ad-hoc manner as well as structured manners with other protocols.

The Electronic Device 100 is also depicted as communicating to the Network 1000 via Network Interface 160 which provides a wired interface for the Electronic Device 100 to communicate externally. The Network Interface 160 may employ one or more wired interfaces including, but not limited to, DSL, Dial-Up, DOCSIS, Ethernet, G.hn, ISDN, MoCA, PON, and Power line communication (PLC). The Network Interface 160 may interface directly to Network 1000 or via one or more interfaces sch as a Network Device 1020.

As depicted, the Electronic Device 100 includes one or more Central Processors (CPUs) 110 as well as one or more Graphical Processing Units (GPUs) 120. Each of the CPU 110 and GPU 120 are coupled to ROM 140 and RAM 150. A non-exhaustive list of examples for any of CPU 110 and GPU 120 includes a central processing unit, a single core microprocessor, a multi-core microprocessor, a digital signal processor (DSP), a reduced instruction set computer (RISC), a complex instruction set computer (CISC), a virtual central processing unit and the like. A GPU may be an internal GPU, a hybrid GPU or an external GPU. Furthermore, any of CPU 110 and GPU 120 may be part of application specific integrated circuits (ASICs) or may be a part of application specific standard products (ASSPs). A non-exhaustive list of examples for memories providing ROM 140 includes any combination of the following semiconductor devices such as registers, latches, ROM, EEPROM, flash memory devices, universal serial bus (USB) removable memory, and the like. A non-exhaustive list of examples for memories providing RAM 150 includes any combination of the following semiconductor devices such as registers, latches, flash memory devices, non-volatile random access memory devices (NVRAM), SDRAM, DRAM, double data rate (DDR) memory devices, SRAM, universal serial bus (USB) removable memory, and the like.

Electronic Device 100 may include an audio input element, Audio Input 114, for example a microphone, and an audio output element, Audio Output 116, for example, a speaker, coupled to any of CPU 110. Electronic Device 100 may include a video input element, Video In 118, for example, a video camera or camera, and a video output element, Display 112, for example an LCD display, coupled to any of processors 210. Electronic Device 100 also includes a Keyboard 115 and Touchpad 117 which may for example be a physical keyboard and touchpad allowing the user to enter content or select functions within one of more software applications, Applications 152. Alternatively, the Keyboard 115 and Touchpad 117 may be predetermined regions of a touch sensitive element forming part of the display within the Electronic Device 100. The one or more Applications 122 are typically stored in RAM 150 and are executable by any combination of CPU 110 and GPU 120. The RAM 150 also stores one or more operating systems, OS 154, one or more file systems, File Systems 156, program data, Program Data 158, and other software, Other Program Modules 155 as well as Applications 152. The ROM 140 stores the basic input/output system (BIOS) for the CPU 110 and GPU 120.

The Electronic Device 100, as depicted, also incorporates a Controller 125 which communicates with an External Device 1050 and an External Storage 1040. The External Device 1050 and External Storage 160 may include, but not be limited to, a hard disc drive (HDD), magnetic disk drive, an optical disk drive, and solid state memory. The Controller 125 may communicate with the External Drive 1050 and External Storage 1040 with a serial interface and/or parallel interface. The Electronic Device 100 also includes an Audio Codec 153 and a Video Codec 151 where such codecs (coders-decoders) may be a device or computer application for encoding or decoding a digital data stream or signal.

The Electronic Device 100 also includes a Protocol Stack 130 which may implement, but not be limited to, an IEEE 802.11 protocol stack but alternatively may exploit other protocol stacks such as an Internet Engineering Task Force (IETF) multimedia protocol stack for example. Likewise, AP Stack 1030B within the AP 1030 exploits a protocol stack but is not expanded for clarity. Elements of Protocol Stack 130 and AP Stack 1030B may be implemented in any combination of software, firmware and/or hardware. Within the exemplary configuration of an IEEE 802.11, Protocol Stack 130 may include an IEEE 802.11-compatible PHY module that is coupled to one or more Tx/Rx & Antenna Circuit 170 and an IEEE 802.11-compatible MAC module coupled to an IEEE 802.2-compatible LLC module. Protocol Stack 130 may also include, for example, a network layer IP module, a transport layer User Datagram Protocol (UDP) module, a transport layer Transmission Control Protocol (TCP) module, a session layer Real Time Transport Protocol (RTP) module, a Session Announcement Protocol (SAP) module, a Session Initiation Protocol (SIP) module and a Real Time Streaming Protocol (RTSP) module. Protocol Stack 130 may also include a presentation layer media negotiation module and a call control module whilst in some configurations the Protocol Stack 130 may also incorporate the one or more Audio Codecs 153 and one or more Video Codecs 151. Applications 152 may be able to create, maintain and/or terminate communication sessions with any Network Device 1020 by way of AP 1030.

Applications 152 may activate any of the SAP, SIP, RTSP, media negotiation and call control modules for that purpose whilst information can propagate from the SAP, SIP, RTSP, media negotiation and call control modules to the PHY module through TCP module, IP module, LLC module and MAC module. It should be noted that elements of the Electronic Device 100 may also be implemented within the AP Stack 1030B within AP 1030. PEDs, FEDs, and wireless devices as represented by Electronic Device 100 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

One or more other devices, referred to as associated devices, not depicted for clarity may be coupled to the Electronic Device 100 through a wireless interface or wired interface, or optical interface. Such ASDEVs may include, but not be limited to, a wearable device, a PED, a FED, a medical implant etc. In addition to the AP Stack 1030B the AP 1030 incorporates other elements, including but not limited to, Processor 1030A, Memory 1030C, and Antenna 1030D.

Accordingly, Electronic Device 100 represents a block diagram illustrating a computer system on which graphics pipeline emulation systems, applications and platforms in their entirety or partially in conjunction with one or more other Electronic Devices 100 and/or other PEDs, FEDS, wearable devices, embedded devices, servers and other forms of computing devices etc. may be implemented in accordance with exemplary embodiments of the disclosure. Elements of the Electronic Device 100 may be coupled via one or more system buses with, for example, RAM 150, ROM 140, CPU 110, GPU 120, Controller 125, Network Interface 160, Front End Tx/Rx & Antenna 170. The GPU 120 communicates with the CPU 110 via a system bus or system busses or other interface to receive input data and/or executable program codes and/or send back computation results. Such a system bus or buses may include, but not be limited to, a bus memory or bus memory controller, a peripheral bus, and a local bus that is able to interact with any other bus architecture. Examples of such system bus or busses may include, but not be limited to, PCI, ISA, PCI-Express, HyperTransport™, InfiniBand™, Serial ATA, I2C, and other suitable interconnects.

In some aspects of the disclosure, the GPU 120 may include an interface for providing output data to the Display 112. The GPU 120 may drive the Display 112 by providing graphics data from an image buffer (not shown for clarity). In other aspects of the disclosure, the GPU 120 may include internal memory, e.g. video RAM, RAM, and any number of buffers.

As noted above the CPU 110 may include a single or multiple sets of processors having single or multiple cores. The CPU 110 or GPU 120 may discretely or in combination execute one or more computer-executable codes implementing the techniques of the present disclosure. The system memory of the Electronic Device 100 may be any memory for storing data used herein and/or computer programs that are executable by the CPU 110 and GPU 120 and may include RAM 150, ROM 140, non-volatile memory such as flash memory for example or any combination thereof. The BIOS 145 within ROM 140 may store the basic procedures for transfer of information between elements of the computer system represented by Electronic Device 100, such as those at the time of loading the OS 154 from RAM 150 with the use of the ROM 140. Further, whilst Electronic Device 100 is depicted as coupled to remote memory via Network 100 within first to third Servers 1010A to 1010C respectively or External Storage 1040 via Controller 125 the computer system represented by Electronic Device 100 may also include one or more storage devices, not depicted for clarity, such as one or more removable storage devices, one or more non-removable storage devices, or a combination thereof. Such removable storage devices and/or non-removable storage devices may be connected to the system bus or buses as well as being one or more External Devices 1050 also coupled to the Electronic Device 100 via Controller 1050. Within embodiments of the disclosure storage devices and their corresponding computer-readable storage media are power-independent modules for the storage of computer instructions, data structures, program modules, and other data of the computer system represented by Electronic Device 100.

As depicted, RAM 150 stores the OS 154, File Systems 156, Program Data 158, and Other Program Modules 155 together with the Applications 152 and, optionally, codecs such as Audio Code 153 and Video Codec 151. However, within embodiments of the disclosure these may be stored within the system memory, e.g. RAM 150, as well as within one or more other removable storage devices and/or non-removable storage devices of the computer system represented by Electronic Device 100. Specific portions of the stored data may be associated with specific memory and/or memory devices or these may be distributed and/or dynamically assigned. In addition to the interfaces described with respect to Electronic Device 100, namely Touchpad 117, Keyboard 115, Video In 118. Audio In 114, Display 112, and Audio Out 116 other input/output (I/O) interfaces may be employed for receiving input and providing output to users or external devices. Optionally, one or more of these I/O interface may be associated with another Electronic Device which is coupled to the Electronic Device 100 via wired, wireless or optical interface. For example, user input may be made via a wearable device coupled to the Electronic Device 100 via a short range wireless interface such as Bluetooth, for example. Such external devices and/or other Electronic Devices 100 may include peripheral devices, such as a mouse, a stylus, a game controller, or other peripheral devices, such as a printer or scanner via one or more I/O ports. Such I/O ports may provide optical and/or wired interface including, but not limited to a serial port, a parallel port, a universal serial bus (USB) port, or other peripheral interface ports. The Display 112 may be a monitor, LCD display, LED display, plasma display, a projector, etc. either integrated as part of or in communication with the Electronic Device 100.

As noted above when a user seeks to access either a remote application with a local file or a local application with a remote file, the user can be presented with a directory listing of folders and/or files allowing them to select the appropriate electronic content/file they wish to access with the application. For example, one such protocol is Remote Desktop Protocol (RDP) from Microsoft™. RDP provides a user with a graphical interface to connect to another computer over a network connection wherein the user employs RDP client software for this purpose whilst the other computer runs RDP server software. However, RDP requires that information be transferred, in one instance, from a local file system associated with a client's device to a remote file system associated with a remote application the user has launched or is launching in order to allow the remote application to access the local file. In another instance, RDP requires that information be transferred from a remote file system to a local file system associated with a local application the user has launched or is launching in order to allow the local application to access the remote file.

However, these protocols such as RDP require that the communications channel between the local system and the remote system in either instance transfer a significant amount of information, which results in a slow and downgraded user experience even with a large bandwidth channel and low latency storage media. Accordingly, either or both of a lower bandwidth network channel and high latency storage media will result in slower transfer and acquisition of the file system information further downgrading the user's experience.

Aspects of the present disclosure address the above and other deficiencies by allowing for information relating to a local or remote file system to be transferred to the appropriate remote or local application and/or file system such that an enhanced user experience is provided to the user even where the communication channel bandwidth is limited and/or high latency storage media store the local and/or remote file system, as discussed in more detail herein.

Figure 2:
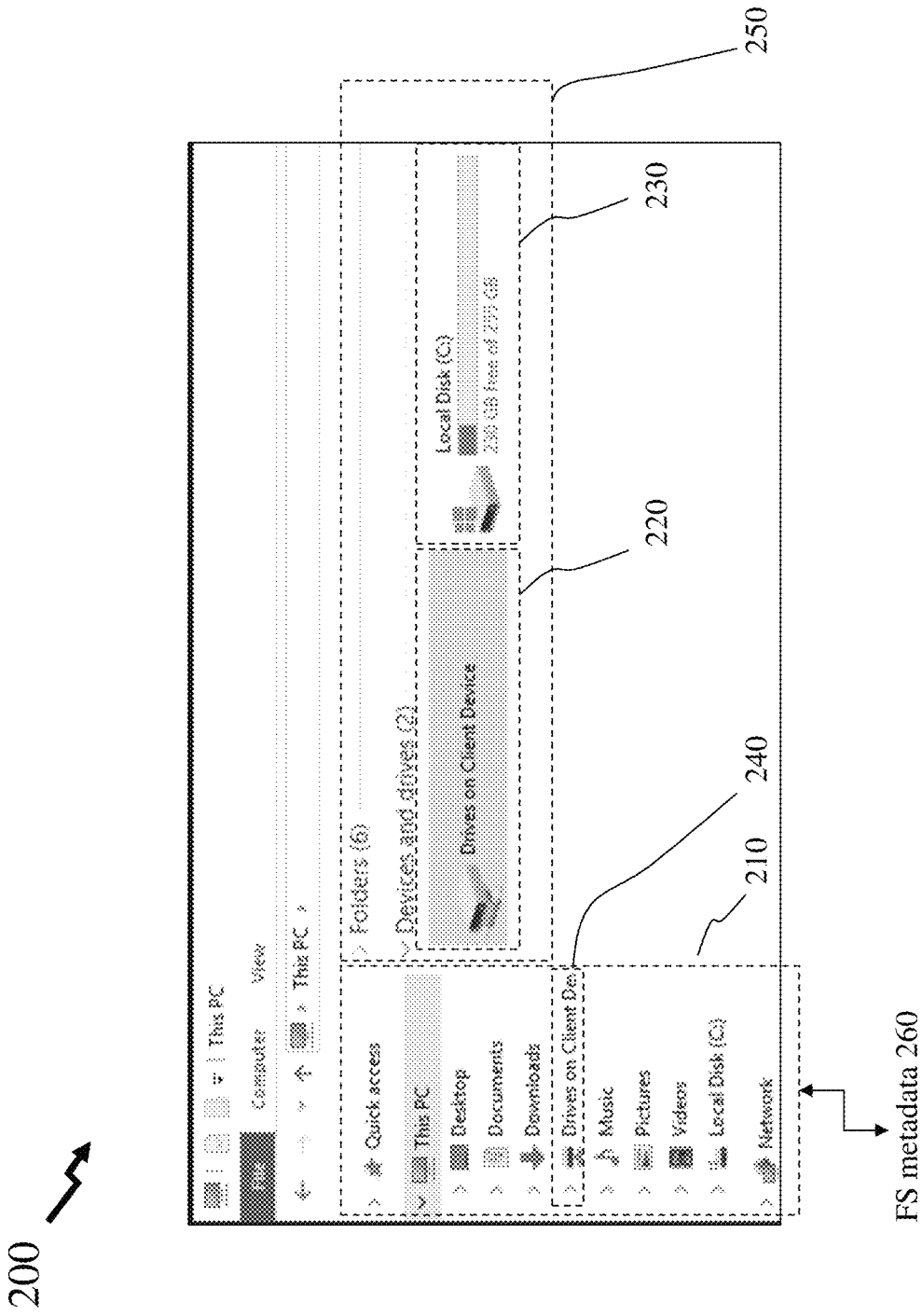
FIG. 2 depicts an example user interface presented on a client device to allow a user working with remote applications or desktops to browse files on the client device, in accordance with aspects of the present disclosure.

Referring to FIG. 2 there is depicted a graphical user interface (GUI) 200 presented on a client device (electronic device 100) to allow a user working with remote applications or desktops to browse files on the client device, in accordance with aspects of the present disclosure.

As shown, GUI 200 presents the First Menu 210 providing the user with a listing of accessible directories identified, in this instance "Desktop", "Documents", "Downloads", "Music", "Pictures", "Videos" and "Local Disk (C:)." Also depicted within First Menu 210 is "Drives on Client Dev" 240 which is abbreviated form of "Drives on Client Device" which is a mapped remote file system. Also depicted in GUI 200 is Second Menu 250 which defines sub-sections of "Folders (6)" and "Devices and Drives (2)." The sub-section "Folders (6)" being collapsed but if expanded would list "Desktop", "Documents", "Downloads", "Music", "Pictures", and "Videos." "Devices and Drives (2)" depicts "Drives on Client Device" 220 and "Local Disk (C:) 230. Accordingly, if the user selects either "Drives on Client Device" 220 in Second Menu 250 or "Drives on Client Dev" 240 in First Menu 210 then these would expand to provide the user with a listing of folders and/or files stored upon the remote file system.

An existing remote desktop session solution mounts a local client device as a network folder to a remote session. When a user accesses a file through a save or load action within an application or listing from a systems Operating System (OS) file browser in a high-latency network, it takes time for the user to be presented with a list of files and/or folders allowing them to change the folder and then list files within the new folder. This leads to differences between user experiences when opening local files to opening remote files.

According to aspects of the present disclosure, GUI 200 is provided using metadata-only virtual file system (FS) associated with a remote access session established between the client device and the remote server. The metadata-only virtual FS only includes file metadata (FS metadata 260) for files residing in the local file system of the client device. As a result, the gap between accessing local file(s) and/or local file system(s) and accessing remote file(s) and/or remote file system(s) is significantly reduced.

Within the following description focus is given to "Read" operations that lists all files and folders which is a frequently used operation by users with respect to file systems and accordingly, even relatively small improvements, can lead to a significant improvement overall for the user's experience. However, it would be evident that the embodiments of the disclosure may be applied to other operations, such as "Save" and "Load" for example, although additional steps and/or functions may be required in conjunction with such critical operations in order to avoid data loss.

Figure 3:
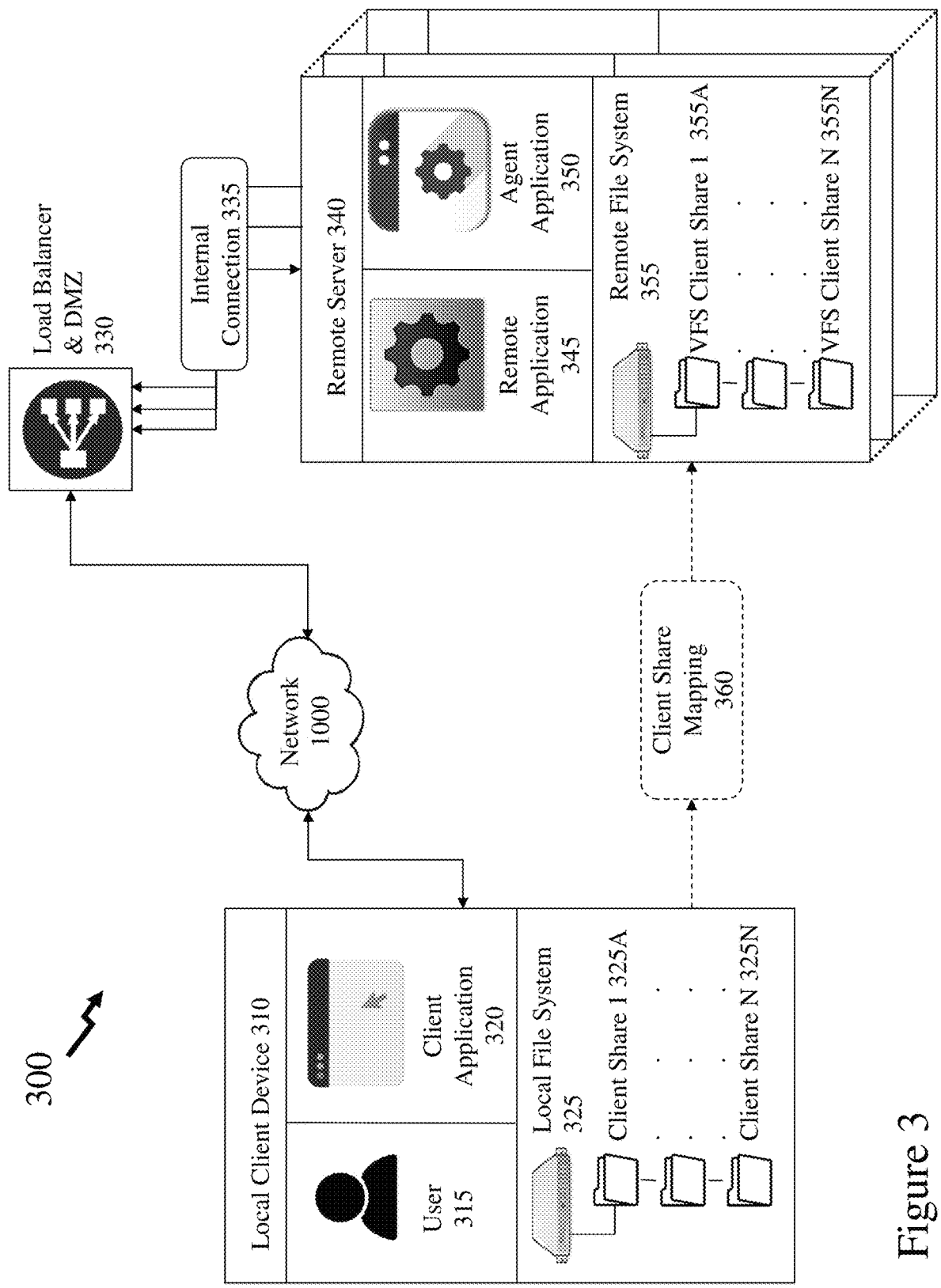
FIG. 3 depicts schematically an exemplary system configuration within which embodiments of the disclosure may be implemented.

Referring to FIG. 3 there is depicted a system schematic (system) 300 representing an exemplary system configuration within which embodiments of the disclosure may be implemented. Accordingly, System 300 delivers applications, running on a Remote Server 340, to a Local Client Device 310. An example of such a system is Parallels™ Remote Application Server (Parallels RAS) which is an application virtualization software produced by Parallels™ allowing Microsoft™ Windows applications to be accessed via individual devices from a shared server or cloud system without the necessity of installing them. Accordingly, Parallels RAS enables Microsoft™ Windows applications to be used on devices that typically could not run them, for example Apple™ Macintosh (Mac) family personal computers, mobile devices, and Google™ Chromebooks. Optionally, a system such as Parallels RAS allows software delivery from on-premises, public, private, or hybrid cloud storage networks (clouds).

As depicted System 300 comprises a Local Client Device 310 which is capable of running a Client Application and which is physically accessible by a user, for example a PED, FED, or wearable device such as described and depicted with respect to Electronic Device 100 in FIG. 1. The Local Client Device 310 communicates with a Remote Server 340 via Network 1000, such as described in respect of FIG. 1, via a Load Balancer and Demilitarized Zone (DMZ) 330 and an Internal Connection 335. Internal Connection 335 linking multiple Remote Servers 340 to the Load Balancer and DMZ 330. The Load Balancer and DMZ 330 may be a gateway or a similar network device that hosts software for managing the processing of multiple Client Application connections (of client applications 320 on multiple client devices 310) and routing them to the most suitable or available Remote Server 340 of the plurality of Remote Servers 340 connected to the Load Balancer and DMZ 330. Each Remote Server 340 is a server to which the user, typically, has no physical access to and that is capable of running applications in remote sessions. Examples of a Remote Server 340 may include, but not be limited to, a Remote Desktop Session Host (RDSH), an X server, and an X.Org server.

Accordingly, as depicted in System 300 a User 315 is accessing a Client Application 320 on the Local Client Device 310. The Local Client Device 310 stores a Local File System 325 comprising a series of client shares, denoted as Client Share 1 to Client Share N. A client share refers to a directory or a sub-directory including folders and/or files associated with the user 315 of the local client device 310. The Client Application 320 can communicate with a Remote Application 345 on a Remote Server 340 via the Network 1000, Load Balancer and DMZ 330, and network Connection 335. The Remote Server 340 hosts an Agent Application 350 (also referenced as FS agent 1012) employed to track files opened and/or saved to a physical storage medium by applications running under a user session on the Remote Server 340 from Local Client Device 310.

Embodiments of the disclosure use a separate communications channel (e.g., RDP channel), depicted in System 300 in FIG. 3 by Client Share Mapping 360 channel, between the Local Client Device 310 and the Remote Server 340. Client Share Mapping 360 channel can be used to transfer file requests between the client device 310 and the remote server 340. In particular, when an initial connection request of the client device 310 is received by the load balancer & DMZ 330, it is routed to the most suitable (based on bandwidth, location, etc.) remote server (e.g., an application server) 340. The remote server 340 can establish a remote access session with the client device 310. The agent application 350 can then create a metadata-only virtual file system associated with the remote access session. The metadata-only virtual file system only includes file metadata for files residing in the local file system of the client device. The metadata-only virtual file system that represents the structure of all client shares 325 and is provided (via client share mapping 360 virtual channel) to the client device 310 where it is used to present the client shares to the user 315 in response to the user's List request (a request to see a list of directories, folders and/or files), as shown in FIG. 2. When the user 315 selects one of the files, a request to access content of the file is generated and sent to the virtual file system 355, which redirects it to a file system driver implementing at least a sub-tree of the local file system 325 of the client device 310. In some embodiments, when the user requests to open the file or writes to the file, the request is redirected to the local file system 325 (for a local file stored on the client device 310) or the remote file system (for a mapped file stored remotely)

As such, an improved user experience is provided to users browsing local files, within Local File System 325, whilst working with Remote Applications, such as Remote Application 345, or Remote Desktops (not depicted for clarity). Whilst within the following descriptions in respect of FIGS. 4 to 6 respectively as well as above in respect of FIG. 3 the Client Share Mapping 360 is described and depicted from the viewpoint of the user browsing local files through a Remote Application, such as Remote Application 345, it would be evident to one of skill in the art that alternatively embodiments of the disclosure may support enhanced user experience when accessing remote files, such as upon Remote File System 355, with a local application upon the Local Client Device 310, such as Client Application 320 or another application (not depicted for clarity).

At a high level the systems and methods described and depicted with respect to FIGS. 3 to 6 respectively create a Virtual File System (VFS) 355 which is stored, for example, upon the Remote Server 340 for every Remote Session created as a result of a user, such as User 315, accessing a Remote Application 345 upon the Remote Server 340 via a Client Application 320 upon their Local Client Device 310. Optionally, the VFS may be stored upon a different storage location to that forming part of the Remote Server 340 provided that the alternate storage location is accessible by the Remote Server 340. Such an alternate storage location may be a dedicated low latency storage medium with a high bandwidth connection to the Remote Server 340. Alternatively, the VFS 355 may be stored within a dedicated low latency memory forming part of the Remote Server 340.

Accordingly, the VFS 355 provides for reduced latency in listing folders and/or files within Client Shares. As depicted within FIG. 3 the Client Share Mapping 360 generates a mapping of the Local File System 325 within the Remote File System 355 of the Remote Server 340. Accordingly, the Client Shares upon the Local Client Device 310, depicted as Client Share 1 325A through to Client Share N 325N, are mapped to Client Shares upon the Remote Server 340, depicted as VFS Client Share 1 355A through to VFS Client Share N 355N.

Figure 4:
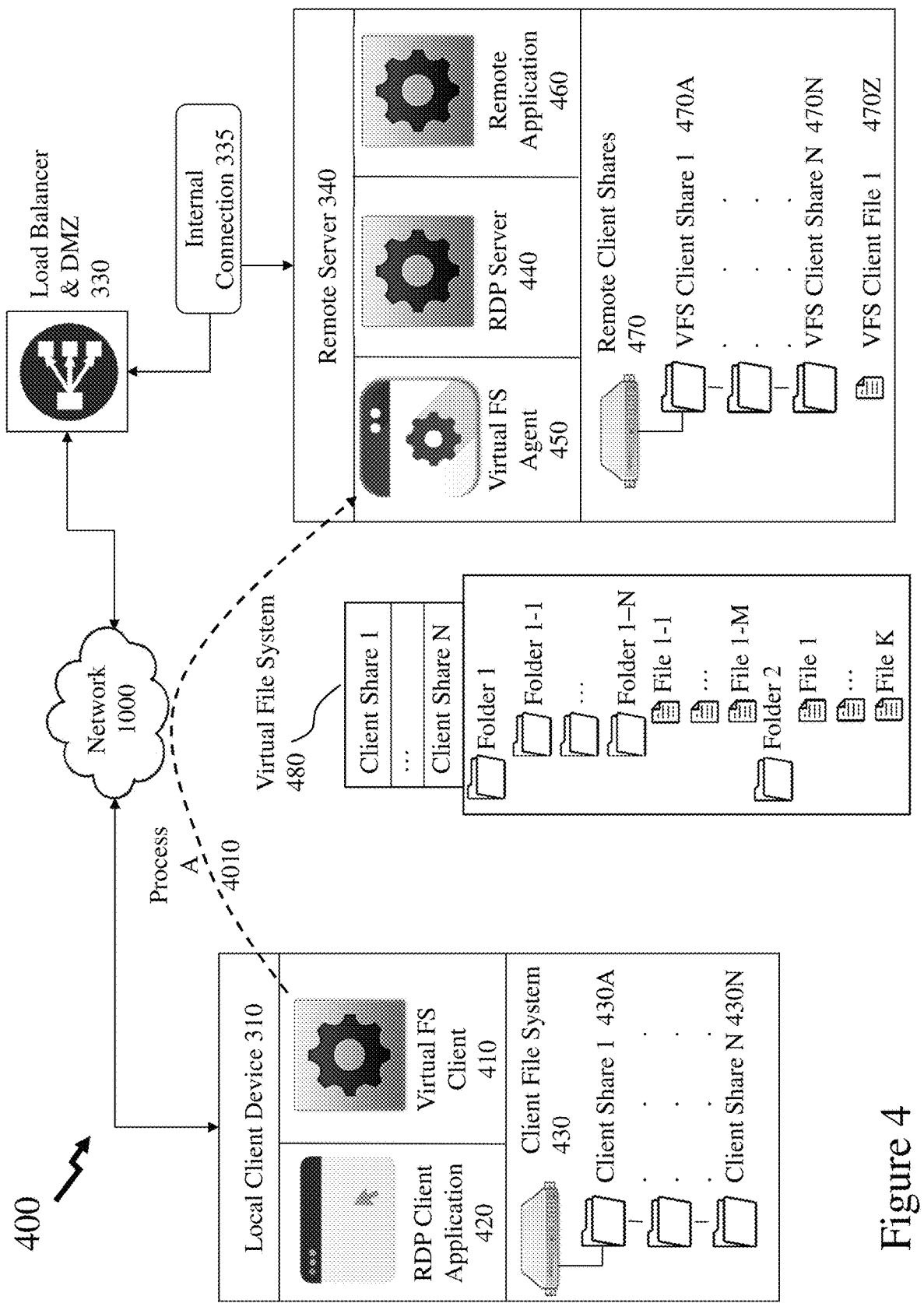
FIG. 4 depicts schematically an exemplary system configuration within which embodiments of the disclosure may be implemented employing a virtual channel to transfer file requests from remote session applications to client device file systems.

Now referring to FIG. 4 there is depicted a system schematic (system) 400 of an exemplary system configuration within which embodiments of the disclosure may be implemented employing a virtual channel to transfer file requests from remote session applications to client device file systems. As depicted the Local Client Device 310 hosts a Client File System 430 comprising a series of Client Shares, depicted as Client Share 1 430A through to Client Share N 430N, a Virtual FS Client 410 and an RDP Client Application 420. The Virtual FS Client 410 representing an application which controls client shares, such as Client Share 1 430A through to Client Share N 430N within the Client File System 430, tracks changes to the client shares and stores them in cache in advance of a request or requests. The RDP Client Application 420 handling the RDP process(es) associated with the client side provisioning, control, interfacing etc. of a Remote Desktop upon the Local Client Device 310.

Within the Remote Server 340 there are depicted an RDP Server 440 which handles the server side provisioning, control, interfacing etc. of a Remote Desktop upon the Local Client Device 310 and the processes upon the Remote Server 340. Also depicted are the Remote Application 460 the user accesses through the Remote Desktop and a Virtual FS Agent 450. The Virtual FS Agent 450 representing an application which reads data sent from the Virtual FS Client 410 on the Local Client Device 310 and creates the local Virtual File System (VFS) upon the Remote Server 340. This local VFS being depicted by Remote Client Shares 470 and the associated VFS Client Share 1 470A through VFS Client Share N 470N which mirror the Client Share 1 430A through to Client Share N 430N within the Client File System 430. Also depicted is a VFS Client File 1 470Z which is associated with the session upon the Remote Desktop and the instantiation of the Remote Application 460.

Accordingly, as depicted a process, Process A 4010, transfers the data relating to the Client File System 430 from the Local Client Device 310 via Virtual FS Client 410 to the Virtual FS Agent 450 and therein generating the Remote Client Shares 470. This Process A 4010 transferring the Virtual File System (VFS) 480 according to the System 400 is depicted in FIG. 4. Process A 4010 being handled by a separate RDP channel via the Network 1000 to that employed for the Remote Desktop session. As depicted, the Process A 4010 is direct from Local Client Device 310 to Remote Server 340 but it may also be routed via Load Balancer and MZ 330 and Internal Connection 335 as is the Remote Desktop session. Optionally, Process A 4010 may employ an existing RDP channel via Network 1000 rather than create a new RDP channel. Optionally, Process A 4010 may employ an alternate network to Network 1000.

As depicted within FIG. 4, the VFS 480 comprises a series of Client Shares, depicted as Client Share 1 to Client Share N which correspond to the Client Shares on the Client File System 430 of the Local Client Device 310, these being Client Share 1 430A through to Client Share N 430N. These Client Shares comprise a plurality of hierarchal folders, having a top level depicted as Folder 1 and Folder 2 with a series of sub-folders and files within each folder. For example, Folder 1 is depicted as comprising sub-folders Folder 1-1 through Folder 1-N where Folder 1-N is expanded to show it contains a series of files, File 1-1 to Film 1-N. Similarly, Folder 2 is expanded to depict that it comprises a plurality of files, File 2-1 to File 2-K.

Accordingly, when a user upon the Local Client Device 310 accesses an application upon a Remote Server 340, for example Remote Application 345 as depicted in System 300 in FIG. 3 or Remote Application 460 as depicted in System 400 in FIG. 4, then communications via an existing or new RDP channel are established between applications upon the Local Client Device 310, for example the Virtual FS Client 410 as depicted in System 400 in FIG. 4, and the Remote Server 340, for example the Virtual FS Agent 450 as depicted in System 400 in FIG. 4. Accordingly, with the establishment of a session for the User with respect to the application upon the Remote Server 340, then a Virtual File System (VFS) is created using the existing or new RDP channel. In some embodiments, a VFS is created for a single session and is isolated from any other VFS generated for other sessions.

As noted above, aspects of the present disclosure create and maintain the VFS in order to enhance user experience through the Remote Application, for example Remote Application 345 as depicted in System 300 in FIG. 3 or Remote Application 460 as depicted in System 400 in FIG. 4, by speeding up folder and/or file listing operations. Accordingly, the initiated VFS for the user session is empty and requires populating with a file tree, e.g. the hierarchy of files and/or folders on all Client Shares of the user. Accordingly, once initiated, the VFS is populated with metadata relating to the folders and/or files of the Client Shares. Within embodiments of the disclosure, different metadata population methodologies may be employed. For example, folder by folder metadata delivery may be implemented such as described and depicted below in respect of FIG. 5 or a root folder first metadata delivery may be implemented such as described and depicted below in respect of FIG. 6. Additionally, other methodologies and processes for metadata transfer to populate the VFS may be employed without departing from the scope of the disclosure.

Each metadata transfer methodology may be applicable to a subset of session scenarios according to one or more factors, including for example, size of file share(s) being transferred, number of folders, number of files, etc. Each metadata transfer methodology is intended to speed up the process of populating the VFS and accordingly the user side application, e.g. Virtual FS Client 410 in System 400 in FIG. 4, to send portions of the file tree wherein the transfer, for example, starts from the root folders of one share after another or the root folder content of every share and then proceeds deeper into each share.

Figure 5:
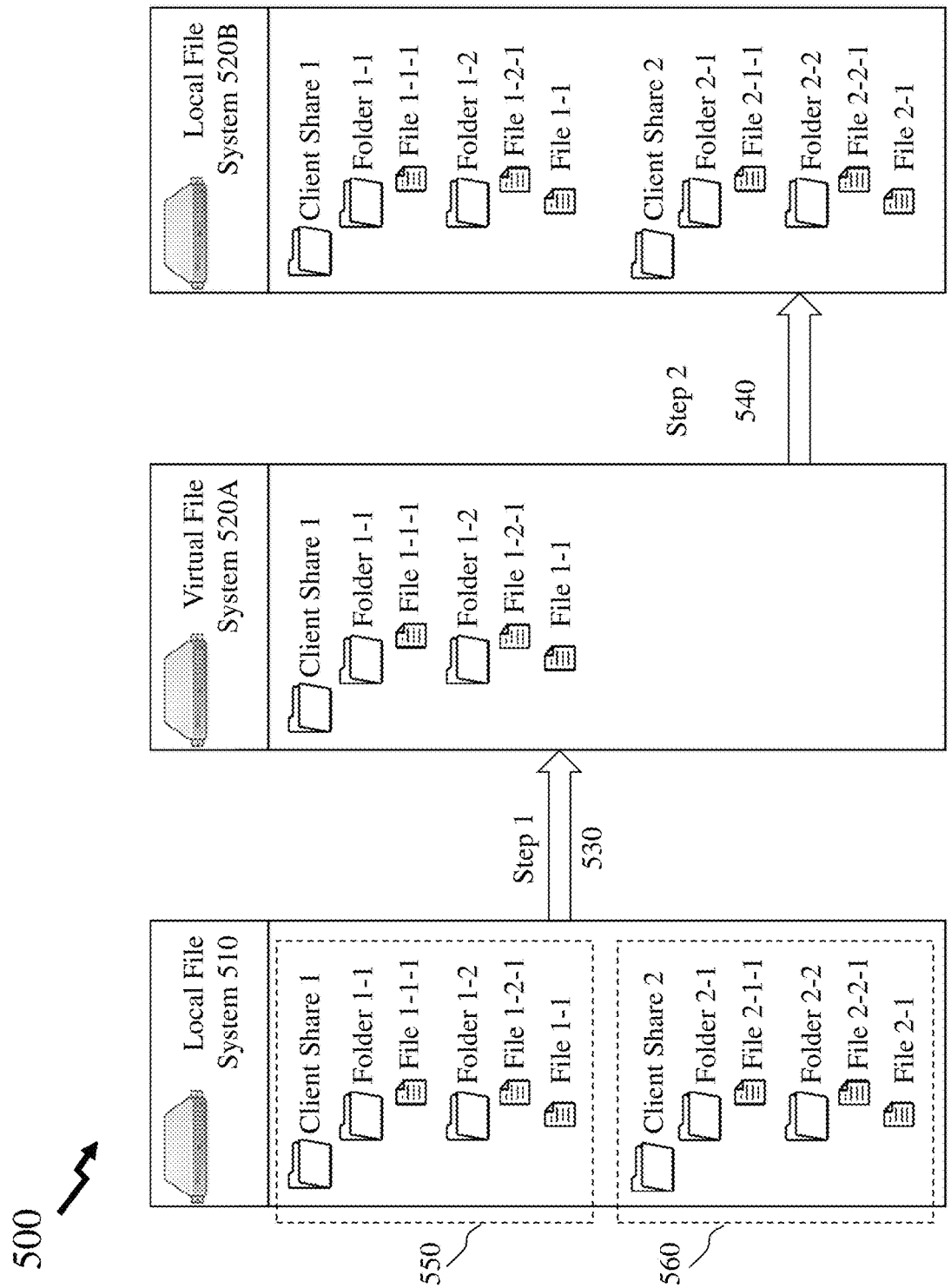
FIG. 5 depicts schematically an exemplary content structure delivery method according to an embodiment of the disclosure exploiting a folder by folder transfer methodology.

Referring to FIG. 5 there is depicted a schematic 500 of an exemplary metadata delivery method according to an embodiment of the disclosure exploiting a folder by folder transfer methodology. Whilst this approach is considered to be beneficial for small file shares and fast population of the VFS, it may also be employed within other scenarios. Schematic 500 is depicted for a Local File System 510 comprising two Client Shares, Client Share 1 550 and Client Share 2 560 which are transferred in a pair of steps, Step 1 530 and Step 2 540.

As depicted, Client Share 1 550 comprises Folder 1-1, File 1-1-1, Folder 1-2, File 1-2-1, and File 1-1. This is transferred in the first step, Step 1 530 resulting in first VFS 520A.

As depicted Client Share 2 560 comprises Folder 2-1, File 2-1-1, Folder 2-2, File 2-2-1, and File 2-1. This is transferred in the second step, Step 2 540 resulting in second VFS 520B.

Figure 6:
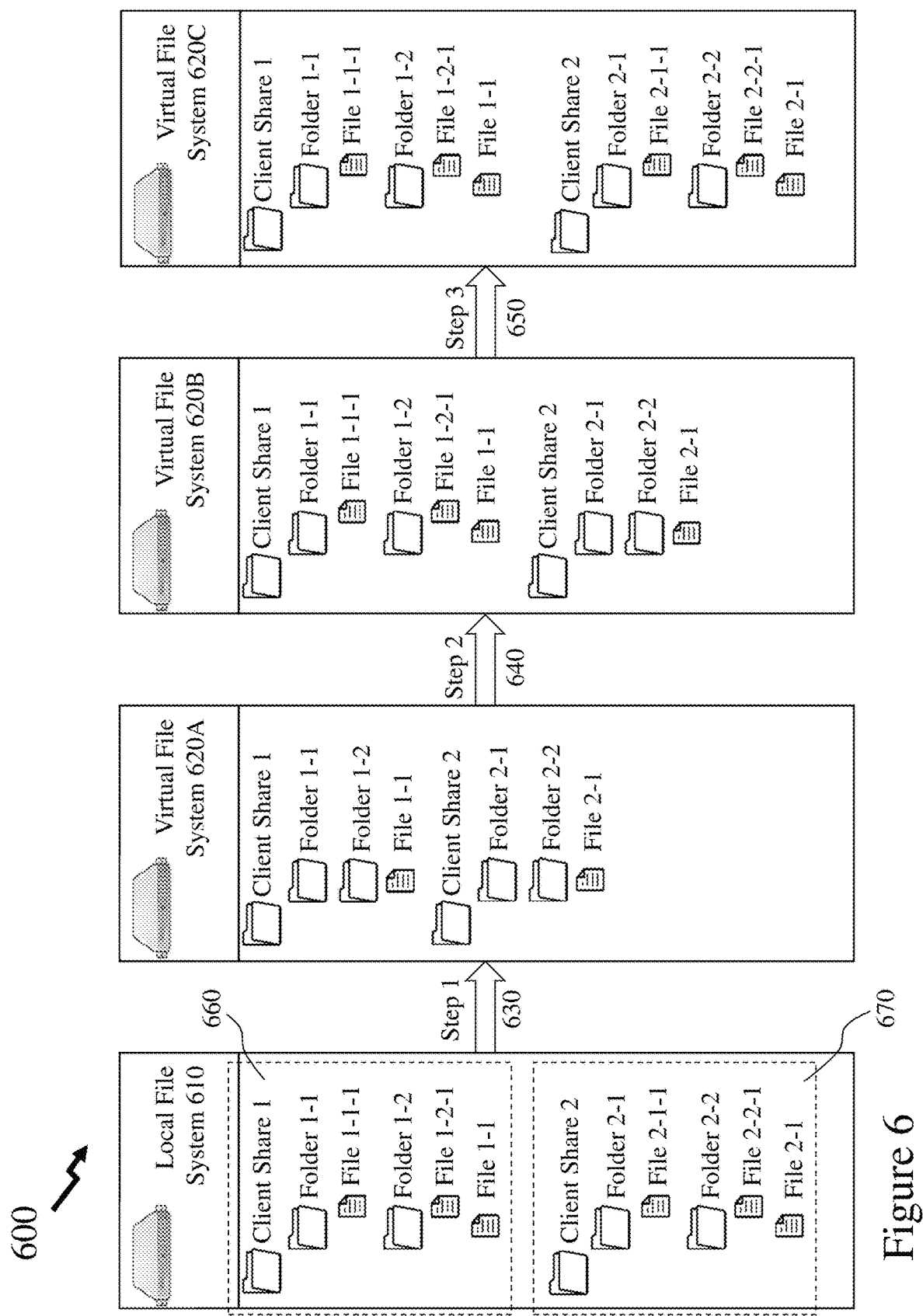
FIG. 6 depicts schematically an exemplary content structure delivery method according to an embodiment of the disclosure exploiting a root folder transfer first methodology.

Referring to FIG. 6 there is depicted a schematic 600 of an exemplary metadata delivery method according to an embodiment of the disclosure exploiting a folder by folder transfer methodology. Whilst the inventors consider this to be beneficial for larger file shares and fast access to folders of the VFS, this may be employed within other scenarios. Schematic 600 is depicted for a Local File System 610 comprising two Client Shares, Client Share 1 660 and Client Share 2 670 which is transferred in three steps, Step 1 630, Step 2 640 and Step 3 650.

As depicted, Client Share 1 660 comprises Folder 1-1, File 1-1-1, Folder 1-2, File 1-2-1, and File 1-1 whilst Client Share 2 670 comprises Folder 2-1, File 2-1-1, Folder 2-2, File 2-2-1, and File 2-1.

As depicted, first through third steps Step 1 630, Step 2 640 and Step 3 650 comprise:

First step 630 wherein the root folder titles of each share are transferred resulting in first VFS 620A;
Second step 640 wherein the deeper levels of Client Share 1 660 are transferred resulting in second VFS 620B; and
Third step 650 wherein the deeper levels of Client Share 2 670 are transferred resulting in third VFS 620C.

It would be evident that a variant of Schematic 600 may progress level by level for all Client Shares for the hierarchy of each Client Share. In this manner, a Client Share X (X=1, . . . , N) may have first sub-folders Folder X-Y (Y=1, . . . , M), second sub-folders Folder X-Y-Z (Z=1, . . . , R) within one or more folders Folder X-Y, and third sub-folders X-Y-Z-A (A=1, . . . , S) within the one or more folders Folder X-Y-Z. In a first pass, metadata relating to the first sub-folders Folder X-Y within each Client Share X is transferred. In a second pass, metadata relating to the second sub-folders Folder X-Y-Z is transferred for each Client Share X. Then in a third pass, metadata relating to the third sub-folders Folder X-Y-Z-A is transferred for each Client Share X. Accordingly, the process represented by Schematic 600 and its variants progresses deeper with each pass.

In some embodiments, metadata transfer processes represented by Schematic 500 in FIG. 5 and Schematic 600 in FIG. 6 may be terminated prior to transfer of the metadata for all files and/or folders within the one or more Client Shares if the user starts to select a file or folder within a Client Share or works in some other manner with one of the Client Shares. In the event the user performs such an action then a notification is sent to the Client Application, e.g. Virtual FS Client 410 in FIG. 4, indicating that the user is working with a particular folder and that accordingly the process represented, for example, by Schematic 500 in FIG. 5 or Schematic 600 in FIG. 6 should be suspended and that the Client Application, e.g. Virtual FS Client 410 in FIG. 4, targets the selected folder and its associated contents preferentially. Optionally, the determination of the client action with respect to a file or folder may be established upon the remote server wherein the remote server then requests preferential metadata transfer relating to the file(s) and/or folder(s) and/or Client Share. Optionally, an existing process of transferring metadata may be temporarily suspended whilst the metadata relating to the user action is transferred. Optionally, the determination of the client action may be established upon a client device, e.g. Local Client Device 310.

Within other embodiments of the disclosure, the Client Application, e.g. Virtual FS Client 410 in FIG. 4, extracts metadata relating to "recent files" such as described and depicted within U.S. patent application Ser. No. 16/363,039 entitled "Recent File Synchronization and Aggregation Methods and Systems" filed Mar. 25, 2019 the entire contents of which are herein incorporated by reference. Accordingly, the VFS is populated based upon folders and/or files recently accessed by the user before the remainder of the Client Shares are populated.

Within other embodiments of the disclosure the Client Application, e.g. Virtual FS Client 410 in FIG. 4, or another application associated with the user's device, e.g. Local Client Device 310 in FIGS. 3 and 4 respectively, and/or a Remote Server, e.g. Remote Server 340 in FIGS. 3 and 4 respectively, may monitor user activities with respect to all applications or a subset of applications the user accesses and employs to establish statistics relating to folders and/or files the user accesses. Accordingly, the VFS may be populated based upon this statistical information such that frequently accessed Client Share(s) and/or folder(s) and/or file(s) are populated initially before the process proceeds to populate the remaining metadata within the VFS relating to the folder(s) and/or file(s) of the Client Share(s). The statistical data may relate, for example, to a single client share upon a single client device, multiple client shares upon a single client device, and multiple client shares upon multiple client devices.

The embodiments of the disclosure described and depicted in respect of FIGS. 4 to 6 respectively relate to the establishment of a VFS which improves listing operations for a user accessing a Remote Application, e.g. Remote Application 345 in FIG. 3 or Remote Application 460 in FIG. 4. As noted, the VFS is populated with metadata and accordingly, if the user selects a file to open or writes to a file, the VFS redirects this call or calls to the actual file. This may, for example, be a regular network folder share (Client Share) on a client device, e.g. Local Client Device 310 in FIG. 3, or a shared disk, e.g. a mapped RDP shared disk.

The embodiments of the disclosure described and depicted in respect of FIGS. 4 to 6 respectively relate to the establishment of a VFS which improves listing operations for a user accessing a Remote Application, e.g. Remote Application 345 in FIG. 3 or Remote Application 460 in FIG. 4. However, the VFS may within another embodiment of the disclosure be initially populated based upon a search operation performed by the user. Within these embodiments of the disclosure the user may initiate a search, e.g. for a file or folder, then the client device, e.g. Local Client Device 310 in FIGS. 3 and 4 respectively, executes the search, and the Client Application, e.g. Virtual FS Client 410 in FIG. 4, can intercept the returned search results and maps the results matching the search criteria to the VFS so that the VFS is preferentially populated with metadata relating to files and/or folders matching the search criteria prior to completing a population process, such as described within Schematic 500 in FIG. 5 or Schematic 600 in FIG. 6, to finish populating the VFS with metadata for the Client Share(s).

Optionally, within other embodiments of the disclosure where a user selects a file within a partially populated VFS, then a process according to an embodiment of the disclosure, such as described within Schematic 500 in FIG. 5 or Schematic 600 in FIG. 6, may continue to execute as a background process such that a fully populated VFS is subsequently available to the user.

Within the embodiments of the disclosure described and depicted in respect of FIGS. 3 to 6 respectively a Virtual File System (VFS) has been described as being associated with a single session of a user upon a remote desktop with a single application. However, it would be evident that these embodiments of the disclosure may be associated with multiple applications within a single user session or associated with multiple user sessions. For example, whilst a user session is open, the VFS can be generated, modified, maintained etc. as the user works with multiple applications. Optionally, the VFS may be stored in association with a user profile such that when the user logs into a new session, the VFS associated with their profile is retrieved and then subsequently updated, amended, modified etc. The VFS associated with a user's profile may be associated with an expiry such that if the user does not log back in within a predetermined period of time, the VFS is erased. Optionally, portions of the VFS may be time stamped and erased as a predetermined period of time elapses.

Figure 7:
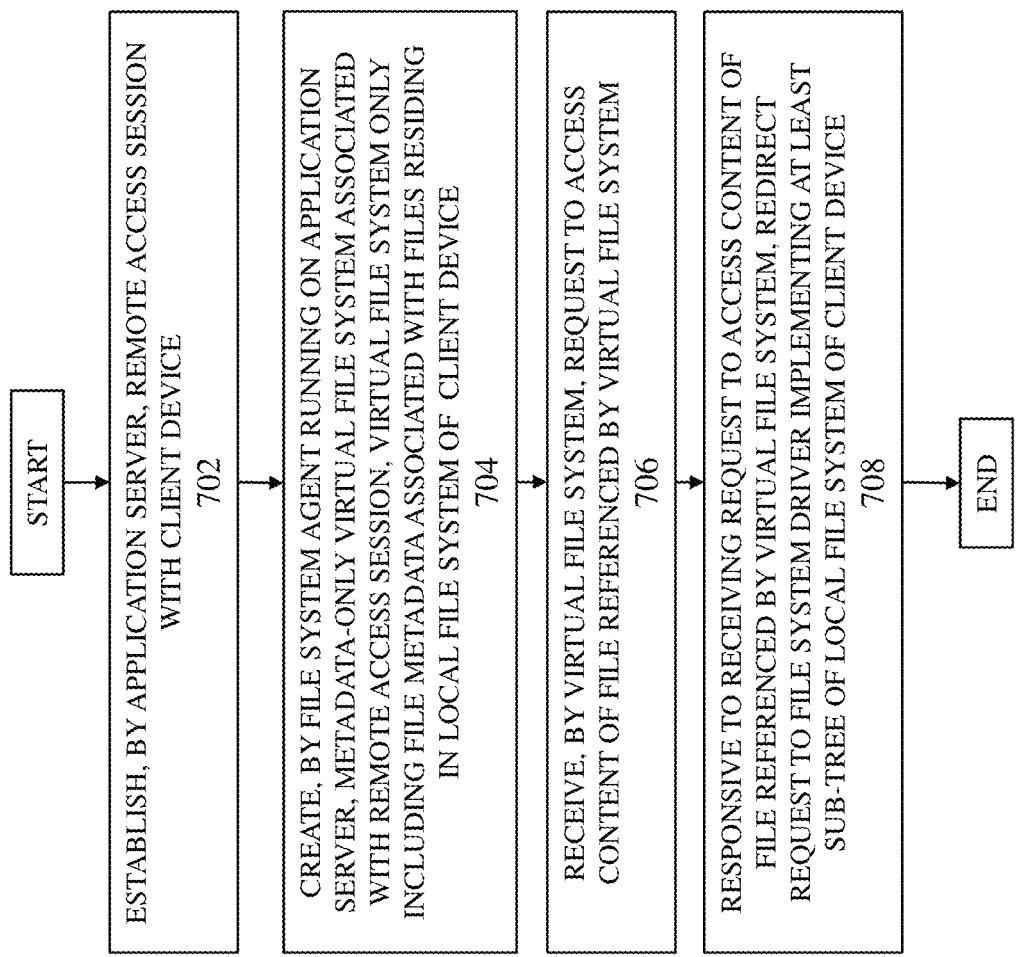
FIG. 7 is a flow diagram of a method to facilitate a presentation of files on a client device of a user working with remote applications or desktops, in accordance with aspects of the disclosure.

FIG. 7 is a flow diagram of a method to facilitate a presentation of files on a client device of a user working with remote applications or desktops, in accordance with aspects of the disclosure. The method is performed by processing logic that may include hardware (circuitry, dedicated logic, etc.), software (such as is run on a general purpose computer system or a dedicated machine), or a combination of both. Some methods may be performed by an application server represented by server 1010 or remote server 340.

For simplicity of explanation, the methods are depicted and described as a series of acts. However, acts in accordance with this disclosure can occur in various orders and/or concurrently, and with other acts not presented and described herein. Further, not all illustrated acts may be required to implement the methods in accordance with the disclosed subject matter. In addition, those skilled in the art will understand and appreciate that the methods could alternatively be represented as a series of interrelated states via a state diagram or events.

Referring to FIG. 7, at block 702, the application server establishes a remote access session with a client device. At block 704, a file system agent running on the application server creates a metadata-only virtual file system associated with the remote access session, where the virtual file system only includes file metadata associated with files residing in a local file system of the client device. In some implementations, creating the virtual file system involves receiving, from the client device, the file metadata associated with the plurality of files residing in the local file system of the client device. The file metadata can be received via the remote access session or via a dedicated virtual communication channel outside of the remote access session. In some implementations, a client application on the client device tracks changes to the plurality of files residing in the local file system of the client device, updates the file metadata based on the tracked changes and stores the updated file metadata in a local cache to prepare for a request for the file metadata from the application server. In some implementations, the file metadata associated with the plurality of files residing in the local file system of the client device is sent to the application server by the client device in an order that is based on one or more statistical criteria pertaining to the plurality of files. The statistical criteria may include, for example, recency of access of a file or frequency of access of a file.

Further, in some implementations, upon receiving, from the client device, a file system request associated with a list operation of the user, the application server transfers the metadata-only virtual file system associated with the remote access session to the client device for presentation of the plurality of files on the client device. Alternatively, the application server can transfer only a subset of the metadata-only virtual file system upon receiving, from the client device, a file system request associated with a search operation of the user, where the subset of the metadata-only virtual file system is limited to file metadata associated with a subset of the plurality of files, the subset of the plurality of files corresponding to a result of the search operation.

At block 706, the virtual file system can receive a request to access content of a file referenced by the virtual file system. At block 708, responsive to receiving the request to access the content of the file referenced by the virtual file system, the application server redirects the request to a file system driver implementing at least a sub-tree of the local file system of the client device, where the sub-tree includes the file that the user would like to access.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, cache, SRAM, DRAM, zero capacitor RAM, twin transistor RAM, eDRAM, EDO RAM, DDR RAM, EEPROM, NRAM, RRAM, SONOS, PRAM, flash memory devices and/or other machine readable mediums for storing information. Other machine readable mediums may include solid state drives (SSDs), magnetic cassettes, magnetic tape, magnetic disk storage, optical storage, compact disks (CD-ROM), and digital versatile disks (DVDs).

The term "machine-readable medium" includes, but is not limited to, portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present disclosure has been presented for purposes of illustration and description. It is not intended to be exhaustive or to limit the disclosure to the precise forms disclosed. Many variations and modifications of the embodiments described herein will be apparent to one of ordinary skill in the art in light of the above disclosure. The scope of the disclosure is to be defined only by the claims appended hereto, and by their equivalents.

Further, in describing representative embodiments of the present disclosure, the specification may have presented the method and/or process of the present disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present disclosure should not be limited to the performance of their steps in the order written, and one skilled in the art can readily appreciate that the sequences may be varied and still remain within the spirit and scope of the present disclosure.

What is claimed is:

1. A remote server comprising:
a memory for storing instructions that are executed by a processing device; and
the processing device forming part of the remote server being coupled to the memory, the processing device configured to:
establish a remote access session with a local client device in communication with the remote server via a network;
establish upon the remote server to create a metadata-only virtual file system within another memory accessible to the remote server;
receive with the virtual file system a request to access content of a file referenced by the virtual file system with a remote application in execution upon the remote server as part of the remote access session; and
redirect the request to access content of the file referenced by the virtual file system to a file system driver implementing at least a sub-tree of the local file system of the local client device; wherein
the virtual file system is associated with the remote access session and allows a plurality of remote applications to access one or more physical file systems in a uniform manner; and
the virtual file system comprises file metadata associated with a plurality of files residing in a local file system of the local client device comprising the one or more physical file systems;
the virtual file system is established in dependence upon data transmitted by a virtual file system client application in execution upon the local client device upon a remote desktop protocol (RDP) channel established between the remote server and the local client device via another network or the network;
the RDP channel is the same RDP channel or a different RDP channel to that established between the remote server and the local client device associated with the remote access session;
the virtual file system client application transmits metadata relating to files within the local file system using a metadata transfer methodology of a plurality of metadata transfer methodologies;
the metadata transfer methodology of the plurality of metadata transfer methodologies is established in dependence upon one or more factors of the local file system of the local client device;
the one or more factors are selected from the group comprising a size of a file share, a number of folders within the file share, and the number of files within the time share; and
the file share on the local client device is associated with a user associated with the remote access session.

2. A remote server comprising:
a memory for storing instructions that are executed by a processing device; and
the processing device forming part of the remote server being coupled to the memory, the processing device configured to:
establish a remote access session with a local client device in communication with the remote server via a network;
establish upon the remote server to create a metadata-only virtual file system within another memory accessible to the remote server;
receive with the virtual file system a request to access content of a file referenced by the virtual file system with a remote application in execution upon the remote server as part of the remote access session; and
redirect the request to access content of the file referenced by the virtual file system to a file system driver implementing at least a sub-tree of the local file system of the local client device; wherein
the virtual file system is associated with the remote access session and allows a plurality of remote applications to access one or more physical file systems in a uniform manner;
the virtual file system comprises file metadata associated with a plurality of files residing in a local file system of the local client device comprising the one or more physical file systems;
the virtual file system is established in dependence upon data transmitted from the local client device to the remote server using a metadata transfer methodology;
the metadata transfer methodology employs statistical information such that a frequently accessed predetermined portion of the local file system is populated initially within the virtual file system;
the frequently accessed predetermined portion of the local file system is a single client share associated with a user of the local client device; and
the statistical information relates to at least one of the single client share, multiple client shares where each client share of the multiple client shares is associated with a different user of the local client device; and multiple client shares upon multiple client devices where each client share of the multiple client shares on each client device of the multiple client devices is associated with a different user of a client device of the multiple client devices.

3. A remote server comprising:
a memory for storing instructions that are executed by a processing device; and
the processing device forming part of the remote server being coupled to the memory, the processing device configured to:
establish a remote access session with a local client device in communication with the remote server via a network;
establish upon the remote server to create a metadata-only virtual file system within another memory accessible to the remote server;
receive with the virtual file system a request to access content of a file referenced by the virtual file system with a remote application in execution upon the remote server as part of the remote access session; and
redirect the request to access content of the file referenced by the virtual file system to a file system driver implementing at least a sub-tree of the local file system of the local client device; wherein the virtual file system is associated with the remote access session and allows a plurality of remote applications to access one or more physical file systems in a uniform manner;

the virtual file system comprises file metadata associated with a plurality of files residing in a local file system of the local client device comprising the one or more physical file systems;

the virtual file system is established in dependence upon data transmitted from the local client device to the remote server using a metadata transfer methodology;

the metadata transfer methodology employs statistical information such that a frequently accessed predetermined portion of the local file system is populated initially within the virtual file system; and either:
the frequently accessed predetermined portion of the local file system is multiple client shares where each client share of the multiple client shares is associated with a different user of the local client device; and the statistical information relates to at least one of the single client share associated with a user of the local client device, the multiple client shares; and multiple client shares upon multiple client devices where each client share of the multiple client shares on each client device of the multiple client devices is associated with a different user of a client device of the multiple client devices;

or:
the frequently accessed predetermined portion of the local file system is multiple client shares upon multiple client devices where each client share of the multiple client shares on each client device of the multiple client devices is associated with a different user of a client device of the multiple client devices; and the statistical information relates to at least one of the single client share associated with a user of the local client device, multiple client shares where each client share of the multiple client shares is associated with a different user of the local client device; and the multiple client shares upon the multiple client devices.

4. A remote server comprising:
a memory for storing instructions that are executed by a processing device; and
the processing device forming part of the remote server being coupled to the memory, the processing device configured to:
establish a remote access session with a local client device in communication with the remote server via a network;
establish upon the remote server to create a metadata-only virtual file system within another memory accessible to the remote server;
receive with the virtual file system a request to access content of a file referenced by the virtual file system with a remote application in execution upon the remote server as part of the remote access session; and
redirect the request to access content of the file referenced by the virtual file system to a file system driver implementing at least a sub-tree of the local file system of the local client device; wherein the virtual file system is associated with the remote access session and allows a plurality of remote applications to access one or more physical file systems in a uniform manner;

the virtual file system comprises file metadata associated with a plurality of files residing in a local file system of the local client device comprising the one or more physical file systems;

the virtual file system is established in dependence upon data transmitted from the local client device to the remote server using a metadata transfer methodology;

the metadata transfer methodology employs statistical information such that a frequently accessed predetermined portion of the local file system is populated initially within the virtual file system;

the transmission of data from the local client device to the remote server is terminated prior to the transfer of all the metadata if a user associated with the remote access session selects one of a file or folder within that portion of a client share already transferred; and the client share is that portion of the local file system associated with the user.

5. A remote server comprising:
a memory for storing instructions that are executed by a processing device; and
the processing device forming part of the remote server being coupled to the memory, the processing device configured to:
establish a remote access session with a local client device in communication with the remote server via a network;
establish upon the remote server to create a metadata-only virtual file system within another memory accessible to the remote server;
receive with the virtual file system a request to access content of a file referenced by the virtual file system with a remote application in execution upon the remote server as part of the remote access session; and
redirect the request to access content of the file referenced by the virtual file system to a file system driver implementing at least a sub-tree of the local file system of the local client device; wherein the virtual file system is associated with the remote access session and allows a plurality of remote applications to access one or more physical file systems in a uniform manner;

the virtual file system comprises file metadata associated with a plurality of files residing in a local file system of the local client device comprising the one or more physical file systems;

the virtual file system is established in dependence upon data transmitted from the local client device to the remote server using a metadata transfer methodology;

the metadata transfer methodology employs statistical information such that a frequently accessed predetermined portion of the local file system is populated initially within the virtual file system;

the transmission of data from the local client device to the remote server is terminated prior to the transfer of all the metadata if a user associated with the remote access session selects one of a file or folder within a portion of a client share of a set of client shares already transferred;

a first client share of the set of client shares is that portion of the local file system associated with the user; and the remaining client shares of the set of client shares are those portions of the local file system associated with one or more other users.

* * * * *